(12) United States Patent
Annavajjala et al.

(10) Patent No.: US 8,290,074 B2
(45) Date of Patent: Oct. 16, 2012

(54) OFDM NETWORKS WITH PSEUDO-RANDOM PHASE PRECODING

(75) Inventors: Ramesh Annavajjala, Quincy, MA (US); Philip V. Orlik, Cambridge, MA (US); Jinyun Zhang, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 421 days.

(21) Appl. No.: 12/691,291

(22) Filed: Jan. 21, 2010

(65) Prior Publication Data

US 2011/0176624 A1 Jul. 21, 2011

(51) Int. Cl.
*H04K 1/10* (2006.01)
(52) U.S. Cl. .................. 375/260; 370/329; 375/346
(58) Field of Classification Search .............. 370/329, 370/338; 375/232, 260, 346, 350; 455/101, 455/428
See application file for complete search history.

(56) References Cited

U.S. PATENT DOCUMENTS

| | | | | |
|---|---|---|---|---|
| 2004/0071240 | A1* | 4/2004 | Betts | 375/346 |
| 2007/0165566 | A1* | 7/2007 | Khan et al. | 370/329 |
| 2008/0287075 | A1* | 11/2008 | Kim et al. | 455/101 |
| 2008/0305788 | A1* | 12/2008 | Malladi et al. | 455/428 |
| 2009/0122854 | A1* | 5/2009 | Zhu et al. | 375/232 |
| 2010/0080279 | A1* | 4/2010 | Saints et al. | 375/232 |

OTHER PUBLICATIONS

J. Luo, K. Pattipati, P. Willett and F. Hasegawa, "Near-optimal multiuser detection in synchronous CDMA using probabilistic data association," in IEEE Communications Letters, vol. 5, No. 9, pp. 361-363, Sep. 2001.

Y. Huang and J. Zhang, "Generalized probabilistic data association multiuser detection," in Proc. IEEE ICC'2004, Jun.-Jul. 2004.

P. H. Tan and L. K. Rasmussen, "Multiuser detection in CDMA—A comparison of relaxation, exact and heuristic search methods," in IEEE Transactions on Wireless Communications, vol. 3, No. 5, pp. 1802-1809, Sep. 2004.

D. Pham, K. Pattipati, P. Willett and J. Luo, "A generalized probabilistic data association detector for multi antenna systems," in IEEE Communications Letters, vol. 8, No. 4, pp. 205-207, Apr. 2004.

P. H. Tan and L. K. Rasmussen, "Asymptotically optimal nonlinear MMSE multiuser detection based on multivariate Gaussian approximation," in IEEE Transactions on Communications, vol. 54, No. 8, pp. 1427-1438, Aug. 2006.

Y. Jia, C. M. Vithanage, C. Andreiu and R. J. Piechocki, "Probabilistic data association for symbol detection in MIMO systems," in IEE Electronic Letters, vol. 42, No. 1, Jan. 5, 2006.

H. Zhao, L. Tong and W. Wang, "Tabu search detection for MIMO systems," in IEEE PIMRC'2007, Sep. 2007.

N. Srinidhi, S. K. Mohammed, A. Chockalingam and B. Sunder Rajan, "Low-complexity near-ML decoding of large non-orthogonal STBCs using reactive tabu search," in Proc. IEEE ISIT'2009, Jun.-Jul. 2009.

\* cited by examiner

*Primary Examiner* — Leon-Viet Nguyen
(74) *Attorney, Agent, or Firm* — Dirk Brinkman; Gene Vinokur (57) ABSTRACT

In an orthogonal frequency division multiplexing (OFDM) network, a set of pseudo random sequences (PRS) are stored at a transmitter and a receiver. Each OFDM symbol is mapped to subcarriers for a set of transmit antennas to produce a mapped symbol. The mapped symbol is encoded using a pseudo-random phase precoder (PRPP) and the PRS to produce a precoded symbol. An inverse fast Fourier transform (IFFT) is applied to the precoded symbol, and the encoded symbol is transmitted to the receiver using the set of transmit antennas.

18 Claims, 8 Drawing Sheets

OFDM NETWORKS WITH PSEUDO-RANDOM PHASE PRECODING

FIELD OF THE INVENTION

This invention relates generally to the field of wireless communications, and more particularly to transmitting data in single-input and multiple-output (SIMO) networks and multiple-input and multiple-output (MIMO) networks with both narrowband and wideband modulation formats.

BACKGROUND OF THE INVENTION

Stations in wireless communication networks can be equipped with multiple antennas at transmitters and receivers to improve data rates and reliability. Wider transmission bandwidths increase capacity but lead to frequency-selective fading, and time-varying multipath fading due to station mobility and Doppler spread.

To cope with time-selective and frequency-selective fading, it is important to use transmission formats such as orthogonal frequency division multiplexing (OFDM), or single-carrier frequency division multiple access (SC-FDMA). In the context of multiuser cellular networks, OFDMA access in an uplink (UL) channel from mobile stations (MS) to a base station (BS) leads to interference avoidance for in-cell MS, and interference averaging for out-of-cell MS.

Due to cost, complexity and size reasons, the number of transmit/receive antennas in mobile stations is typically between 1 and 4, which makes exploitation of MIMO gains difficult. In the context of infrastructure-less networks, such as mobile ad hoc networks, with a single antenna at the MS, the overall network performance is significantly decreased on channels with little time and frequency selectivity due to lack of spatial diversity.

SUMMARY OF THE INVENTION

The embodiments of the invention provide methods for encoding and decoding data over SIMO and MIMO networks with superior reliability when compared to conventional networks, with no penalty on an overall data rate.

The encoding and decoding steps are described separately for both narrowband as well as wideband transmission cases. In particular, for the wideband case, the encoding and decoding procedures are optimized for both OFDM as well as SC-FDMA transmission formats.

The methods provide novel pseudo-random phase precoding (PRPP) at the transmitter, and a low-complexity data detection using an iterative likelihood search (ILS) procedure.

DETAILED DESCRIPTION OF THE PREFERRED EMBODIMENT

The embodiments of our invention provide methods for encoding and decoding data in SIMO and MIMO networks.

Figure 1A:
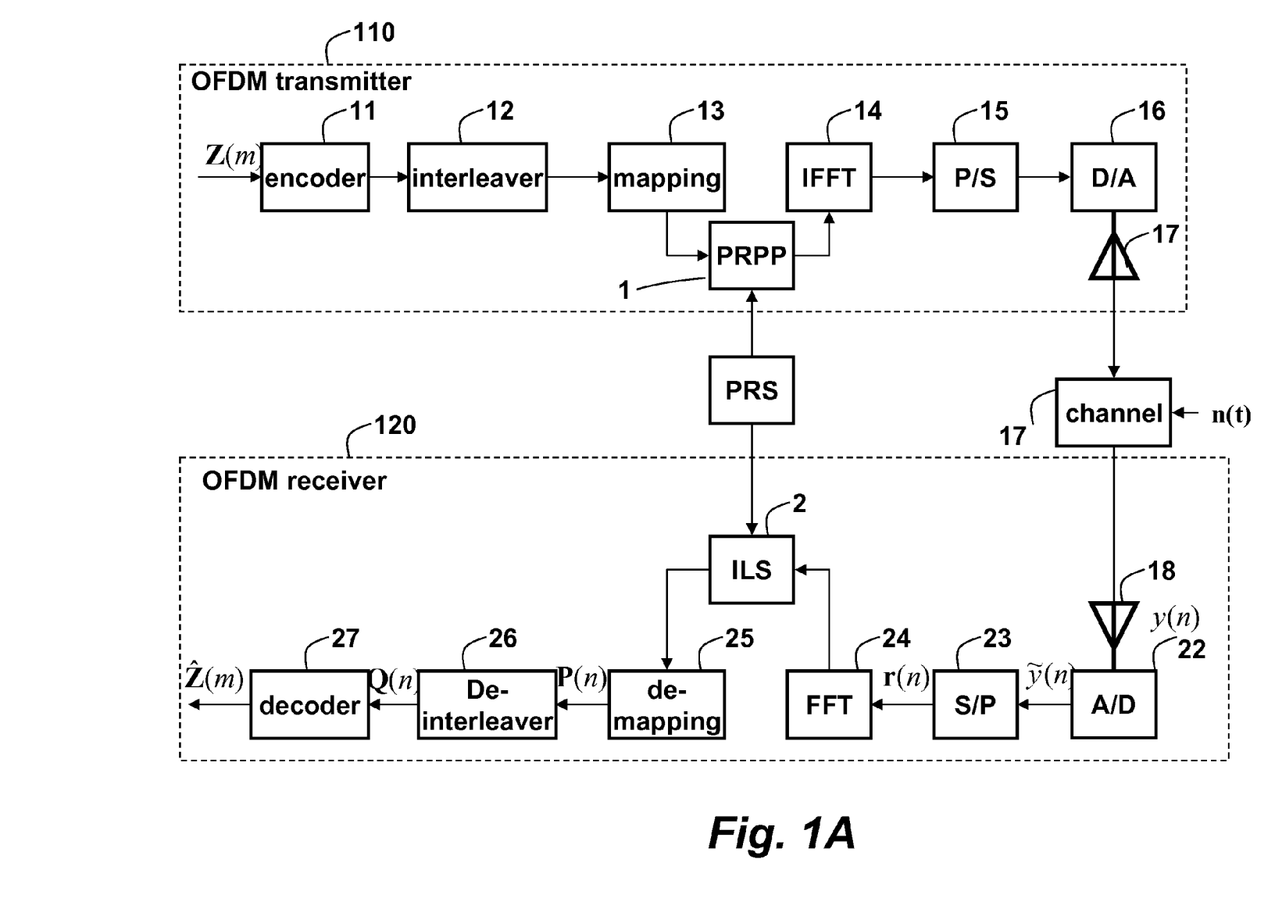
FIG. 1A is a block diagram of an OFDM transceiver according to embodiments of the invention.

FIG. 1A shows a network including a transmitter 110 and a receiver 120 according to embodiments of our invention. In the transmitter, a symbol (signal z(m)) is encoded 11, interleaved 12, mapped 13 to subcarriers, inverse fast Fourier transformed (IFFT) 14, a cyclic prefix is added before parallel-to-serial conversion 15, analog-to-digital converted 16, and transmitted on a channel 17 subject to noise, fading and interference, n(t), via a set of one or more transmit antennas.

In the receiver, the received signal y(t), via a set of one or more receive antennas 18, is analog-to-digital converted 22. Then, the signal is serial-to-parallel converted and the cyclic prefix is removed 23, fast Fourier transformed (FFT) 24, de-mapped 25, de-interleaved 26, and decoded 27 to estimate a signal $\hat{z}$ (m).

Also, our transmitter includes a pseudo-random phase precoder (PRPP) 1 to precode symbols, and our receiver includes a low-complexity iterative likelihood search (ILS) procedure 2 to detect symbols. The PRPP and ILS share a set of pseudo-random sequences (PRS) 130.

Narrowband Single Input and Single Output (SISO) Networks:

We describe a narrowband transmission scenario in which the set of antennas at the transmitter has one transmit antenna, and the set of antennas at the receiver has one receive antenna.

Figure 1B:
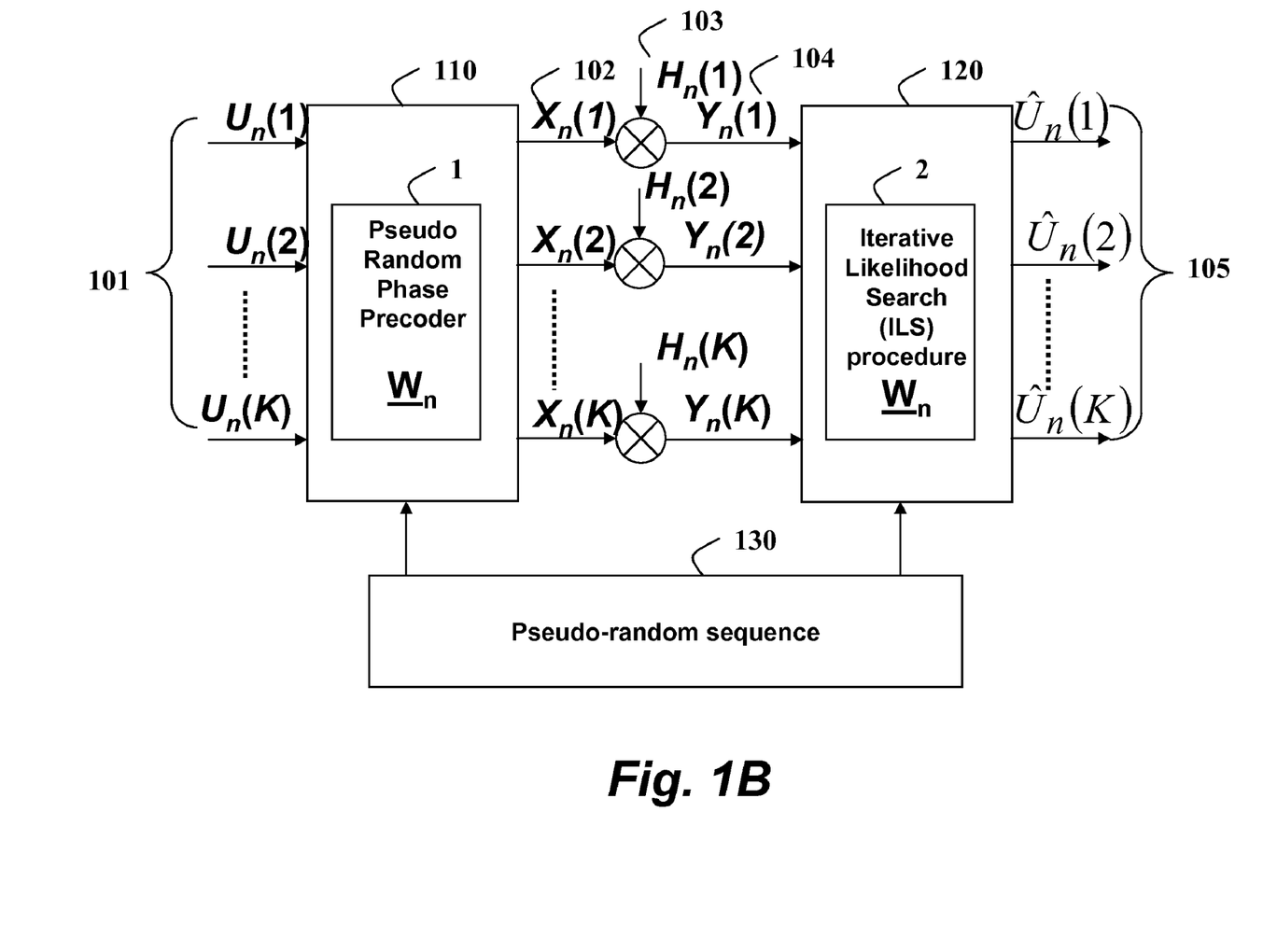
FIG. 1B is a block diagram of a transmitter and a receiver for parallel fading channels in a SISO network according to embodiments of the invention.

As shown in FIG. 1B, we also describe a parallel fading channel model, where K channels are available for data transmission at channel use n.

The K channels can be K disjoint frequency bands, and the channel can be in a time domain. Alternatively, the K channels can be characterized as K disjoint time slots, and the channel use is in a frequency domain. When the channel use is in the time domain, and the number of channels is in the frequency domain, each of these K channels is assumed to be narrowband.

We denote by $U_n(k)$ a complex-valued modulation symbol 101 to be transmitted on channel k at time n. The corresponding decoded signals at the receiver are $\hat{U}_n(k)$ 105. We use the set of PRS 130 that are shared between the transmitter and the receiver.

For a given PRS, a K-by-K pseudo-random phase precoding (PRPP) matrix $W_n$, is used by the transmitter at time n. Here, the number of channels is K, the $(p, q)^{th}$ element, where p denotes the row and q denotes the column index of $W_n$, is $$\exp(j*\theta(p,q))/\sqrt{K},$$

where θ(p, q) is the pseudo-randomly generated phase that is uniformly distributed between −π and π.

The output 102 of the PRPP at channel use n is denoted by $X_n(1), X_n(2), \ldots, X_n(K)$ 102. Using the matrix-vector notation, the output of the PRPP can be expressed as $$\underline{X}_n = \underline{W}_n \underline{U}_n$$

where $\underline{X}_n = [X_n(1), X_n(2), \ldots, X_n(K)]^T$ $$\underline{W}_n = \frac{1}{\sqrt{k}} \begin{bmatrix} e^{j\theta(1,1)} & \cdots & e^{j\theta(1,K)} \\ \vdots & \ddots & \vdots \\ e^{j\theta(K,1)} & \cdots & e^{j\theta(K,K)} \end{bmatrix}, \text{ and}$$

$$\underline{U}_n = [U_n(1), U_n(2), \ldots, U_n(K)]^T$$

The complex-valued channel gain on the $k^{th}$ channel at time n is $H_n(k)$ 103. The vector-valued received signal Y 104 is $$\underline{Y}_n = \underline{H}_n \underline{X}_n + \underline{Z}_n$$

where
$\underline{Y}_n = [Y_n(1), Y_n(2), \ldots, Y_n(K)]^T$
$\underline{H}_n = \text{diag}([H_n(1), H_n(2), \ldots, H_n(K)])$
and $\underline{Z}_n = [Z_n(1), Z_n(2), \ldots, Z_n(K)]^T$ is a noise vector. Because $\underline{X}_n = \underline{W}_n \underline{U}_n$, the received signal $\underline{Y}_n$ is $$\underline{Y}_n = \underline{H}_n \underline{W}_n \underline{U}_n + \underline{Z}_n \quad (1)$$

When the channel matrix $\underline{H}_n$ 103 is available at the receiver, in the absence of PRPP, or when $\underline{W}_n = \underline{I}_n$, where $\underline{I}_n$ is the K-by-K identity matrix, each modulated symbol can be individually demodulated using $$R_n(k) = \frac{Y_n(k)}{H_n(k)} = U_n(k) + \frac{Z_n(k)}{H_n(k)}. \quad (2)$$

That is, there is no inter-channel interference (ICI) in the absence of PRPP. However, because each channel undergoes through only one fading random variable, the diversity order per channel, as well as the overall diversity order, are limited to unity. That is, the above described network without PRPP suffers from severe performance loss.

The PRPP deliberately introduces ICI. That is, the received signal on the $k^{th}$ channel contains signal contributions not only from the $k^{th}$ channel, but also from all other K−1 channels. The impact of this is that the above described single-tap equalization approach, namely, $$R_n(k) = \frac{Y_n(k)}{H_n(k)} = \underline{W}_n(k,k)U_n(k) + \sum_{j=1, j \neq k}^{K} \underline{W}_n(k,j)U_n(j) + \frac{Z_n(k)}{H_n(k)} \quad (3)$$

leads to severe inter-symbol interference.

To improve the performance of PRPP network, we can use maximum-likelihood (ML) detection. The ML approach is essentially a joint detection approach, and has the following form $$\underline{U}_n^{ML} = \underset{\underline{U}_n}{\text{argmin}} (\underline{Y}_n - \underline{H}_n \underline{W}_n \underline{U}_n)^{Herm} \Psi_Z^{-1} (\underline{Y}_n - \underline{H}_n \underline{W}_n \underline{U}_n), \quad (4)$$

where $\Psi_Z$ is a covariance matrix of a noise random vector $\underline{Z}_n$, and Herm is the Hermitian transpose operator. The ML approach searches over all possible vector-valued symbols, $\underline{U}_n$, to determine an optimal vector. However, the ML approach has a search complexity of the order of (size ($U_n$(k)))$^K$, where size ($U_n(k)$) is the constellation size of the modulation symbol $U_n(k)$, which is prohibitively high even for values of K between 10 and 20.

Some of the sub-optimum approaches to obtain an estimate of $U_n$ are:
Using a matched filter (MF) receiver
using a linear minimum mean-square error (LMMSE) receiver;
using a zero-forcing (ZF) receiver; and
using a LMMSE or ZF receiver with, possibly ordered, successive interference cancellation (SIC) techniques.

We describe a reduced complexity detection procedure for the PRPP transmission method according to embodiments of the invention. This detection procedure is the iterative likelihood search (ILS) procedure 2. Note that the ILS procedure described here is similar to the procedure described by Mohammed et al, "Low-complexity detection and performance in multi-gigabit high spectral efficiency wireless systems," in IEEE PIMRC, September 2008, in the context of a narrow-band MIMO network with a large number of antennas at the transmitter as well as at the receiver.

The following are the steps in the ILS procedure.

a) We assume that the receiver has the noise covariance matrix $\Psi_Z$. If $\Psi_Z$ is not known at the receiver, then set $\Psi_Z = I_n$, the identity matrix.
b) We define the noise weighed received signal as $\underline{O}_n = \Psi_Z^{-1/2} \underline{Y}_n$,
c) The effective channel matrix is $\underline{G}_n = \Psi_Z^{-1/2} \hat{\underline{H}}_n \underline{W}_n$ where $\hat{H}_n$ is the channel estimate at the receiver.

Using Steps a), b) and c) The equivalent vector-valued received signal is $$\underline{O}_n = \underline{G}_n \underline{U}_n + \underline{Z}_{n,white}, \quad (5)$$

where $\underline{Z}_{n,white} = \Psi_Z^{-1/2} \underline{Z}_n$ is a whitened noise random vector.

When the modulation symbols $U_n(k)$ are drawn from a complex-valued constellation, such as quadrature phase shift keying (QPSK) or quadrature amplitude modulations (QAM)), The equivalent real-valued version of Equation (5) is $$\underline{O}_{Re,n} = \underline{G}_{Re,n} \underline{U}_{Re,n} + \underline{Z}_{Re,n}, \quad (6)$$

where $$\underline{O}_{Re,n} = \begin{bmatrix} \text{Re}(\underline{O}_n) \\ \text{Im}(\underline{O}_n) \end{bmatrix}$$

$$\underline{G}_{Re,n} = \begin{bmatrix} \text{Re}(\underline{G}_n) & -\text{Im}(\underline{G}_n) \\ \text{Im}(\underline{G}_n) & \text{Re}(\underline{G}_n) \end{bmatrix}$$

$$\underline{U}_{Re,n} = \begin{bmatrix} \text{Re}(\underline{U}_n) \\ \text{Im}(\underline{U}_n) \end{bmatrix}$$

$$\underline{Z}_{Re,n} = \begin{bmatrix} \text{Re}(\underline{Z}_{n,White}) \\ \text{Im}(\underline{Z}_{n,White}) \end{bmatrix},$$

where Re and Im denote real and imaginary components.

When the modulation symbols $U_n(k)$ are drawn from a real-valued binary constellation, we have $$\underline{O}_{Re,n} = \underline{G}_{Re,n} \underline{U}_{Re,n} + \underline{Z}_{Re,n}, \quad (7)$$

where $$\underline{O}_{Re,n} = \begin{bmatrix} \text{Re}(\underline{O}_n) \\ \text{Im}(\underline{O}_n) \end{bmatrix}$$

-continued $$\underline{G}_{Re,n} = \begin{bmatrix} \text{Re}(\underline{G}_n) \\ \text{Im}(\underline{G}_n) \end{bmatrix}$$

$$\underline{U}_{Re,n} = \text{Re}(\underline{U}_n)$$

$$\underline{Z}_{Re,n} = \begin{bmatrix} \text{Re}(Z_{n,White}) \\ \text{Im}(Z_{n,White}) \end{bmatrix}.$$

The detailed ILS procedure steps are as follows.

We denote by $\hat{U}_{Re,n}(i)$ an estimate of $\underline{U}_{Re,n}$ at the end of $i^{th}$ iteration. Denote $$R_{G,n} = $$

$$\underline{G}_{Re,n}^T \underline{G}_{Re,n} = \begin{cases} [\underline{r}_{G,n}(1) \ \ldots \ r_{G,n}(K)] & \text{for } BPSK \text{ inputs} \\ [\underline{r}_{G,n}(1) \ \ldots \ r_{G,n}(2K)] & \text{for } QPSK \text{ and } QAM \text{ inputs} \end{cases}$$

and $\omega_{G,n}(i) = \underline{R}_{G,n}(i,i)$.

The initial estimate of $U_{Re,n}$, $\hat{U}_{Re,n}(0)$ is set as the output of the LMMSE detector. That is, $$\hat{\underline{U}}_{Re,n}(0) = (\underline{G}_{Re,n}^T \underline{G}_{Re,n} + \lambda \underline{I})^{-1} \underline{G}_{Re,n}^T \underline{O}_{Re,n} \quad (8)$$

where $\lambda$ is an appropriate diagonal loading factor that can be set to a fixed number, or can be adaptively varied. By setting $\lambda = 0$, the initial vector corresponding to the ZF detector can be obtained.

For k=1: Number_Iterations a) $z^k = G_{Re,n}^T (\underline{O}_{Re,n} - \underline{G}_{Re,n} \hat{U}_{Re,n}(k))$ b) $z_p^k = z^k(p)$. That is, $z_p^k$ is the $p^{th}$ element of $z^k$ c) $s = \underset{p}{\text{argmin}}((l_{p,opt}^k)^2 \omega_{G,n}(p) - 2l_{p,opt}^k |z_p^k|)$ d) If $(l_{s,opt}^k)^2 \omega_{G,n}(s) < 2l_{s,opt}^k |z_s^k|$ i. $\hat{\underline{U}}_{Re,n}(k+1) = \hat{\underline{U}}_{Re,n}(k) + l_{s,opt}^k \text{sgn}(z_s^k) \underline{e}_s$ ii. $z^{k+1} = z^k - l_{s,opt}^k \text{sgn}(z_s^k) \underline{R}_{G,n,s}$ Else
Terminate the search.
Declare $\hat{U}_{Re,n}(k)$ as the detected data vector Note that $e_s$ in Step 3), D.i is a unit vector with its $s^{th}$ entry only as one, and all the other entries as zero, and $\underline{R}_{G,n,s}$ in Step 3) D.ii is the $s^{th}$ column of the matrix $R_{G,n}$.

In the above ILS procedure, Number_Iterations is the number of iterations, which can be set to a fixed value, or can be varied adaptively depending upon the noise and interference conditions.

We note that the above described ILS procedure produces hard-outputs of the modulation symbols $U_n(k)$. However, various other procedures, listed below, can as well be used to produce soft-estimates (or reliability values) of $U_n(k)$ in the above described PRPP-based invention: J. Luo, K. Pattipati, P. Willett and F. Hasegawa, "Near-optimal multiuser detection in synchronous CDMA using probabilistic data association," in IEEE Communications Letters, vol. 5, no. 9, pp. 361-363, September 2001; Y. Huang and J. Zhang, "Generalized probabilistic data association multiuser detection," in Proc. IEEE ICC'2004, June-July 2004; P. H. Tan and L. K. Rasmussen, "Multiuser detection in CDMA—A comparison of relaxation, exact and heuristic search methods," in IEEE Transactions on Wireless Communications, vol. 3, no. 5, pp. 1802-1809, September 2004; D. Pham, K. Pattipati, P. Willett and J. Luo, "A generalized probabilistic data association detector for multi antenna systems," in IEEE Communications Letters, vol. 8, no. 4, pp. 205-207, April 2004; P. H. Tan and L. K. Rasmussen, "Asymptotically optimal nonlinear MMSE multiuser detection based on multivariate Gaussian approximation," in IEEE Transactions on Communications, vol. 54, no. 8, pp. 1427-1438, August 2006; Y. Jia, C. M. Vithanage, C. Andreiu and R. J. Piechocki, "Probabilistic data association for symbol detection in MIMO systems," in IEE Electronic Letters, vol. 42, no. 1, 5 Jan. 2006; H. Zhao, L. Tong and W. Wang, "Tabu search detection for MIMO systems," in IEEE PIMRC'2007, September 2007; N. Srinidhi, S. K. Mohammed, A. Chockalingam and B. Sunder Rajan, "Low-complexity near-ML decoding of large non-orthogonal STBCs using reactive tabu search," in Proc. IEEE ISIT'2009, June-July 2009.

Note that all the above mentioned references do not employ PRPP in their networks. Note also that the prior art MIMO networks described in the above references typically requires a large number of transmit and receiver antennas to achieve the desired performance gains. In contrast, the PRPP method and network according to embodiments of invention combine time and/or frequency resources while using a substantially smaller number of transmit and receiver antennas. By concurrently exploiting time and/or frequency resources, performance gains can still be obtained in transceivers with only a single transmit or receive antenna. Whereas the prior art networks cannot provide any performance improvement with transceivers that only have one transmit and one receiver antenna.

Figure 2:
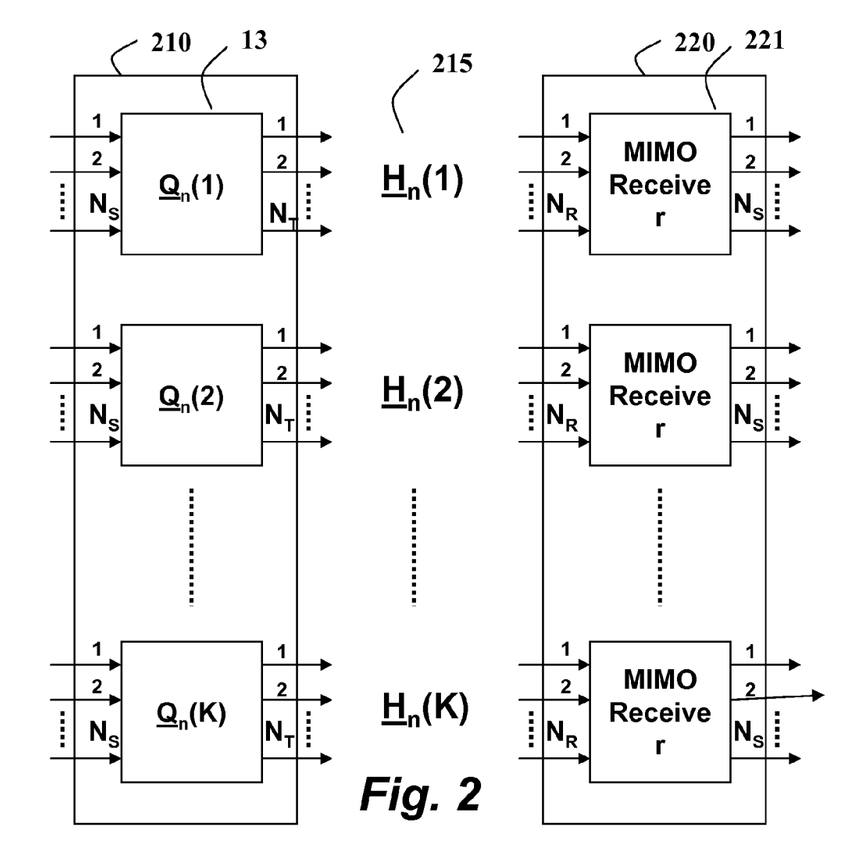
FIG. 2 is a block diagram of a parallel MIMO network without pseudo-random phase precoding according to embodiments of the invention.

Narrowband Multiple Input and Multiple Output (MIMO) Networks:

FIG. 2 shows a transmitter 210 with a set of $N_T$ transmit antennas, and a receiver 220 with a set of $N_R$ receive antennas and MIMO receivers 221 in a MIMO network using K channels 215 without PRPP. The narrowband version of the PRPP transmitter and ILS-based received is described as follows.

The number of spatial streams with the $N_T$ transmit antennas is $N_S$. Note that $N_S \leq N_T$. Let $Q_n(k)$ denote the mapping 13 from the number of streams to the number of transmit antennas at time n on channel k. Note that $Q_n(k)$ is a matrix of size $N_T$-by-$N_S$.

Figure 3:
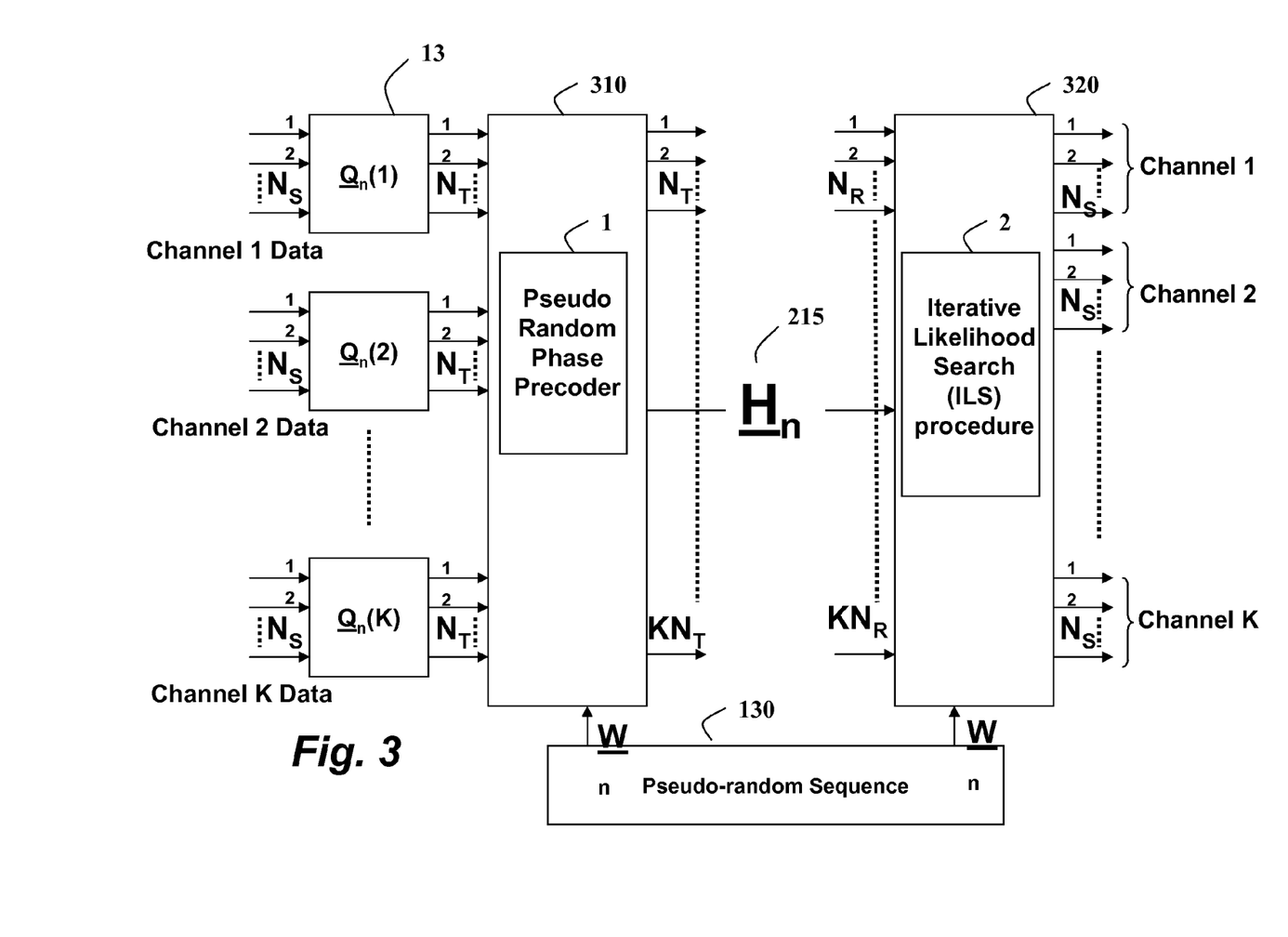
FIG. 3 is a block diagram of a parallel MIMO network with pseudo-random phase precoding according to embodiments of the invention.

FIG. 3 shows a similar configuration but for a transmitter 310 with PRPP, and a receiver 320 with ILS.

Following the same model as described in above, in the absence of PRPP at the transmitter, the received signal model on $k^{th}$ channel at time n is $$\underline{Y}_n(k) = \underline{H}_n(k) \underline{Q}_n(k) \underline{U}_n(k) + \underline{Z}_n(k). \quad (9)$$

In the Equation (9), $\underline{Y}_n(k)$ and $\underline{Z}_n(k)$ are of size $N_R$-by-1, $\underline{H}_n(k)$ is of size $N_R$-by-$N_T$ and $\underline{U}_n(k)$ is of size $N_S$-by-1.

Now, we apply the PRPP matrix $\underline{W}_n$ of size $N_S K$-by-$N_S K$ in the following manner $$\underline{X}_n = \underline{W}_n \underline{U}_n$$

where $$\underline{X}_n = [X_n(1,1), \ldots, X_n(1,N_S), \ldots, X_n(K,1), \ldots, X_n(K,N_S)]^T$$

-continued $$\underline{W}_n = \frac{1}{\sqrt{N_S K}} \begin{bmatrix} e^{j\theta(1,1)} & \cdots & e^{j\theta(1,N_S K)} \\ \vdots & \ddots & \vdots \\ e^{j\theta(N_S K,1)} & \cdots & e^{j\theta(N_S K, N_S K)} \end{bmatrix}$$

and $$\underline{U}_n = [U_n(1,1), \ldots, U_n(1,N_S), \ldots, U_n(K,1), \ldots, U_n(K,N_S)]^T.$$

The equivalent received signal over K channels, each with $N_R$ receive antennas, is $$\underline{Y}_n = \underline{H}_n \underline{W}_n \underline{U}_n + \underline{Z}_n \quad (10)$$

where $$\underline{Y}_n = \begin{bmatrix} \underline{Y}_n(1) \\ \vdots \\ \underline{Y}_n(K) \end{bmatrix}$$

$$\underline{H}_n = \text{diag}([\underline{H}_n(1)\underline{Q}_n(1) \ldots \underline{H}_n(K)\underline{Q}_n(K)])$$

$$\underline{Z}_n = \begin{bmatrix} \underline{Z}_n(1) \\ \vdots \\ \underline{Z}_n(K) \end{bmatrix}.$$

Because the form of Equation (10) is very similar to the form of Equation (1), we use the ILS procedure 2 to detect the data symbol vector $U_n$. We can also use the Tabu search (TS), reactive Tabu search (RTS) or probabilistic data association (PDA), procedures referenced above, to provide soft-estimates of the symbol vector $U_n$.

Figure 4:
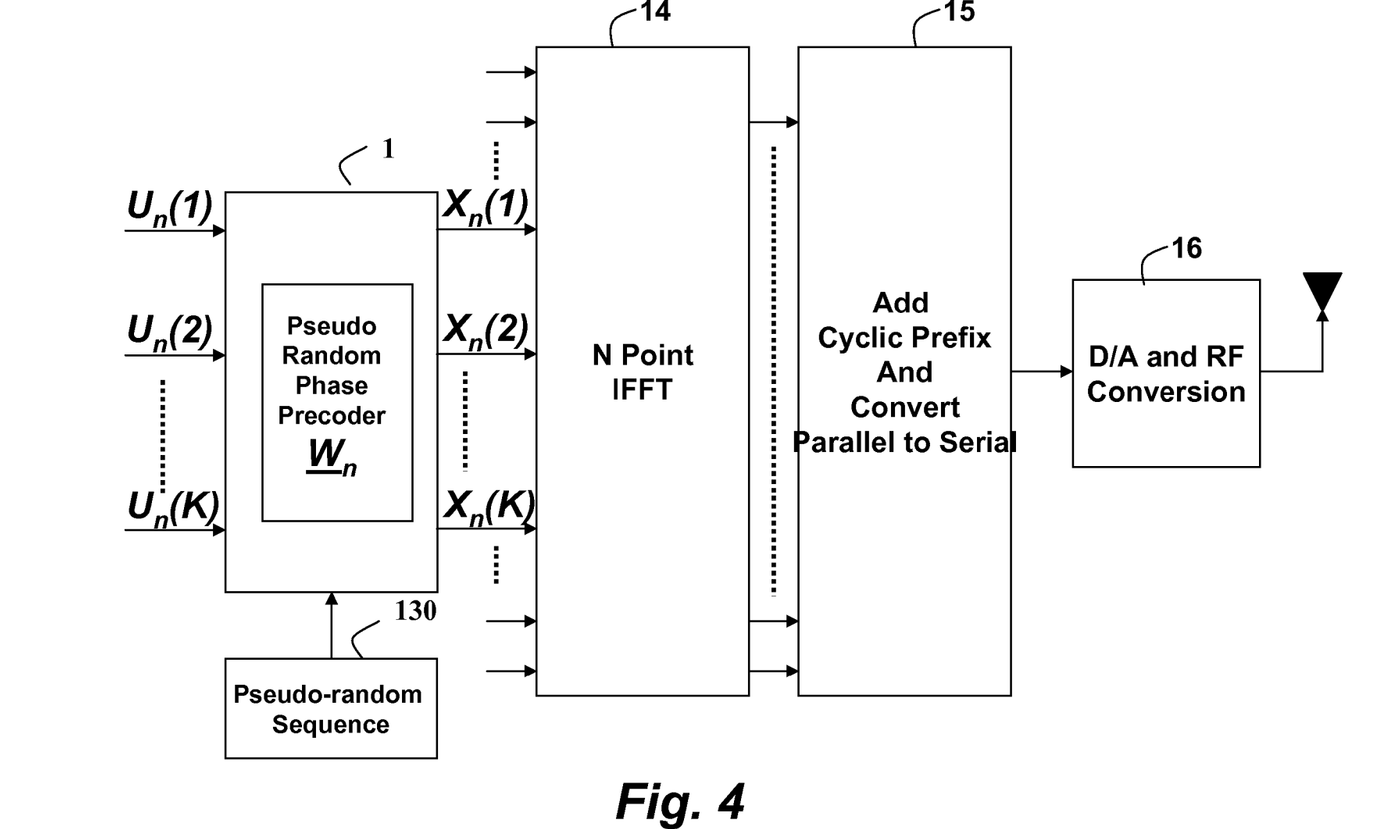
FIG. 4 is a block diagram of a transmitter for an OFDMA network according to embodiments of the invention.

Wideband MIMO Networks Using OFDMA:

The transmitter for the PRPP based OFDMA network is shown in FIG. 4. The transmitter includes the PRPP 1 using the set of PRS 130, the N point inverse fast Fourier transform IFFT) 14, the block 15 to add the cyclic prefix and convert to serial, and the D/A and RF converter 16.

Figure 5:
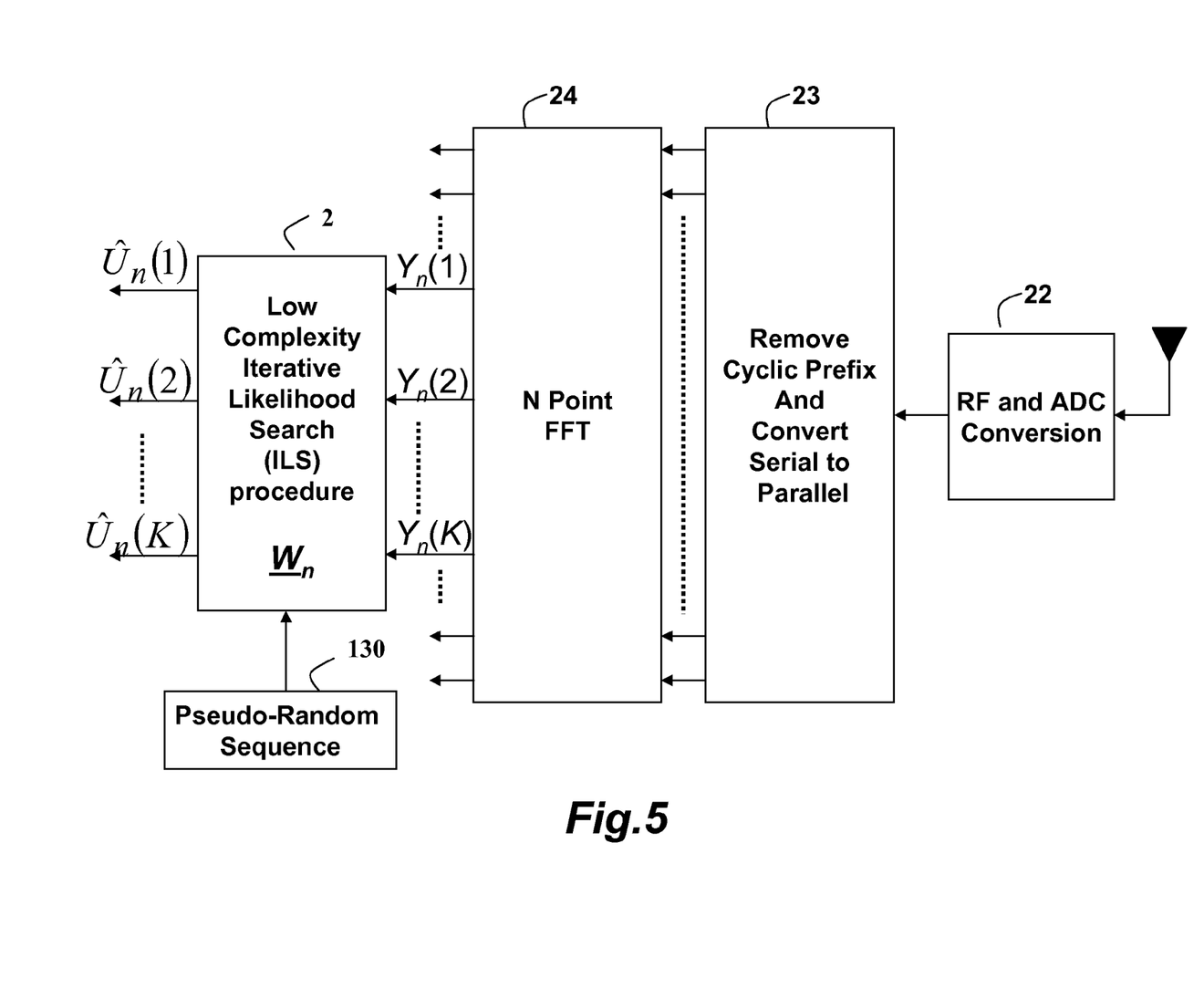
FIG. 5 is a block diagram of a receiver for an OFDMA network according to embodiments of the invention.

FIG. 5 shows the corresponding receiver where the blocks 22, 23, and 24 perform the inverse function of the corresponding blocks in FIG. 4, and the ILS-based detection procedure 2.

For simplicity, FIGS. 4 and 5 describe the SISO case. We can use the ideas of MIMO, as shown in FIGS. 2 and 3, to extend this network to support sets of multiple transmit and receive antennas.

The OFDMA network has $N_F$ subcarriers, the set of $N_R$ receiver antennas, and the set of $N_T$ transmitter antennas. It is a usual practice that the cyclic prefix length is selected to be larger than the maximum delay spread of the channel, and the OFDM symbol duration is made smaller than the channel coherence time so that inter-symbol interference as well as inter-carrier interference are avoided.

The received vector valued signal on the $k^{th}$ subcarrier for OFDM symbol n is $$\underline{Y}_n(k) = \underline{H}_n(k)\underline{Q}_n(k)\underline{U}_n(k) + \underline{Z}_n(k), \quad (11)$$

where, the $(i,j)^{th}$ entry of the channel matrix $\underline{H}_n(k)$ is the channel response from $j^{th}$ transmit antenna to the $i^{th}$ receive antenna on subcarrier k of the OFDM symbol n and $\underline{Q}_n(k)$ is the stream-to-antenna mapping matrix on subcarrier k of the OFDM symbol n.

The PRPP matrix $\underline{W}_n$ at the transmitter for the OFDMA network is $$\underline{X}_n = \underline{W}_n \underline{U}_n$$

where $$\underline{X}_n = [X_n(1,1), \ldots, X_n(1,N_S), \ldots, X_n(N_F,1), \ldots, X_n(N_F,N_S)]^T$$

$$\underline{W}_n = \frac{1}{\sqrt{N_S N_F}} \begin{bmatrix} e^{j\theta(1,1)} & \cdots & e^{j\theta(1,N_S,N_F)} \\ \vdots & \ddots & \vdots \\ e^{j\theta(N_S N_F,1)} & \cdots & e^{j\theta(N_S N_F, N_S N_F)} \end{bmatrix}$$

and $$\underline{U}_n = [U_n(1,1), \ldots, U_n(1,N_S), \ldots, U_n(N_F,1), \ldots, U_n(N_F,N_S)]^T.$$

Note that $N_F$ is the number of subcarriers over which the PRPP matrix is applied and $N_F$ is a configurable parameter depending upon the channel conditions and receiver capabilities.

The equivalent received signal over $N_F$ channels at the set of $N_R$ receive antennas is $$\underline{Y}_n = \underline{H}_n \underline{W}_n \underline{U}_n + \underline{Z}_n \quad (12)$$

where $$\underline{Y}_n = \begin{bmatrix} \underline{Y}_n(1) \\ \vdots \\ \underline{Y}_n(N_F) \end{bmatrix}$$

$$\underline{H}_n = \text{diag}([\underline{H}_n(1)\underline{Q}_n(1) \ldots \underline{H}_n(N_F)\underline{Q}_n(N_F)])$$

$$\underline{Z}_n = \begin{bmatrix} \underline{Z}_n(1) \\ \vdots \\ \underline{Z}_n(N_F) \end{bmatrix}.$$

Because the form of Equation (12) is very similar to the form of Equation (1), we can use the ILS procedure 2 for the wideband OFDMA network of FIGS. 2 and 3 to detect the data symbol vector $U_n$.

Figure 6:
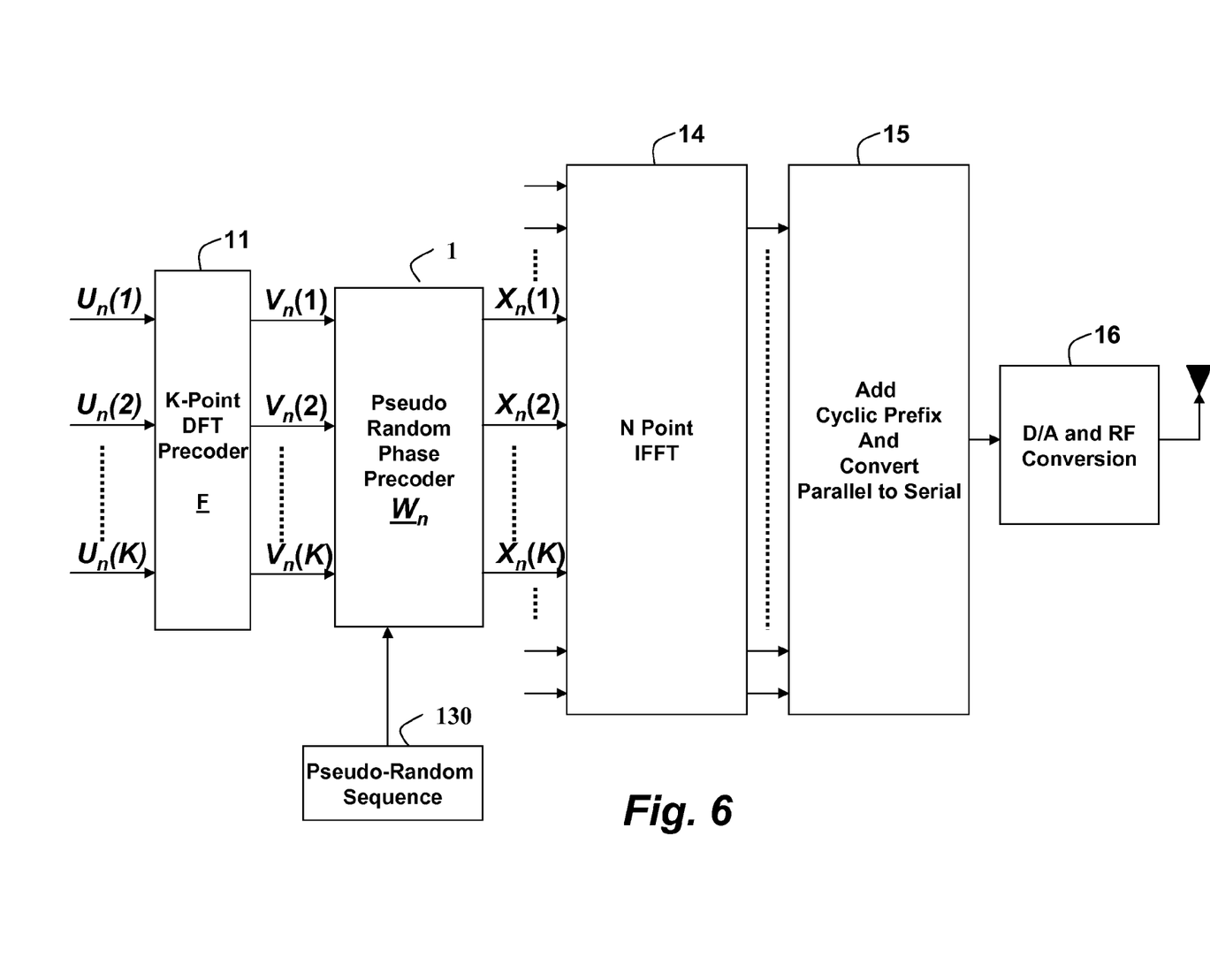
FIG. 6 is a block diagram for a transmitter for a SC-FDMA network according to embodiments of the invention.

Wideband MIMO Networks Using SC-FDMA:

FIG. 6 shows a single-carrier FDMA (SC-FDMA) transmitter with the PRPP 1.

Figure 7:
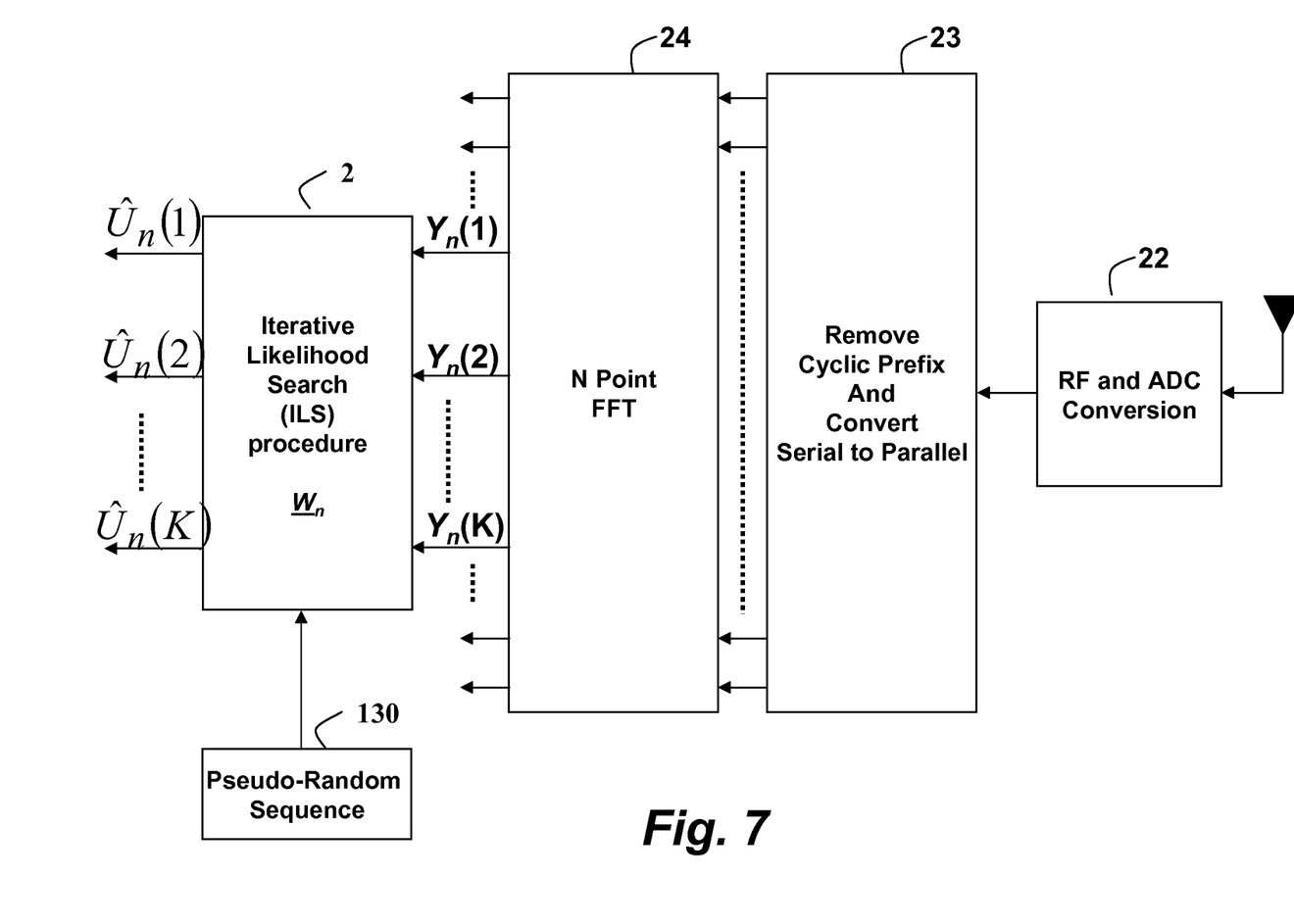
FIG. 7 is a block diagram for a receiver for a SC-FDMA network according to embodiments of the invention.

FIG. 7 shows the SC-FDMA receiver that utilizes the ILS procedure 2 for data detection. For simplicity, FIGS. 6 and 7 describe the SISO case. We can use the ideas of MIMO, as shown in FIGS. 2 and 3 to extend this network to support sets of multiple transmit and receive antennas.

The SC-FDMA is frequently called a DFT-precoded OFDM network. The SC-FDMA is often used to reduce the peak-to-average power ratio problem associated with the OFDM modulation. In the SC-FDMA network without PRPP, a station uses a K-point DFT on the data sequence prior to modulation on the OFDM subcarriers. Although the number of subcarriers available for transmission, N, can be large, the configurable value of K can be based on channel conditions and other needs.

The SC-FDMA network has the set of $N_R$ receiver antennas, and the set of $N_T$ transmitter antennas. For now, we ignore the inter-symbol as well as inter-carrier interference. For this network, the K-length data vector on a transmit antenna/for OFDM symbol n is $$\underline{U}_{I,n} = [U_{I,n}(1), U_{I,n}(2), \ldots, U_{I,n}(K)]^T.$$

The K-by-K PRPP matrix applied on transmit antenna l for OFDM symbol n is $$\underline{W}_{l,n} = \frac{1}{\sqrt{K}} \begin{bmatrix} e^{j\theta_{l,n}(1,1)} & \cdots & e^{j\theta_{l,n}(1,K)} \\ \vdots & \ddots & \vdots \\ e^{j\theta_{l,n}(K,1)} & \cdots & e^{j\theta_{l,n}(K,K)} \end{bmatrix}.$$

The PRPP signal at the output of the transmit antenna l is $$\underline{X}_{l,n} = \underline{W}_{l,n} \underline{F} \underline{U}_{l,n}.$$

The $N_R K$-by-1 received signal at the output of FFT, with PRPP, is $$\underline{Y}_n = \sum_{l=1}^{N_T} \underline{H}_{l,n} \underline{X}_{l,n} + \underline{Z}_n \qquad (13)$$

$$= [\underline{H}_{1,n} \cdots \underline{H}_{N_T,n}] \begin{bmatrix} \underline{X}_{1,n} \\ \vdots \\ \underline{X}_{1,n} \end{bmatrix} + \underline{Z}_n$$

$$= \underline{H}_n \underline{X}_n + \underline{Z}_n.$$

Because the form of Equation (13) is very similar to the form of Equation (1), we can use the ILS procedure 2 described in for the wideband SC-FDMA network of FIGS. 4 and 5 to detect the data symbol vector $U_n$.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for communicating symbols in a network including a transmitter and a receiver, wherein the network uses orthogonal frequency division multiplexing (OFDM), wherein the transmitter has a set of transmit antenna, and wherein the receiver has a set of receive antennas, comprising:

storing a set of pseudo random sequences (PRS) at the transmitter and the receiver;

mapping each symbol to subcarriers for the set of transmit antennas to produce a mapped symbol;

encoding the mapped symbol using a pseudo-random phase precoder (PRPP) and the PRS to produce a precoded symbol, wherein the PRPP uses a K-by-K pseudo-random phase precoding (PRPP) matrix $W_n$ at time n, where a number of channels is K, p denotes a row index and q denotes a column index of the matrix $W_n$, and an element (p, q) in the matrix $W_n$ is $\exp(j*\theta(p, q))/\sqrt{K}$, where $\theta(p, q)$ is a pseudo-randomly phase generated by the PRS uniformly distributed between $-\pi$ and $\pi$;

applying an inverse fast Fourier transform (IFFT) to the precoded symbol; and transmitting the encoded symbol to the receiver using the set of transmit antennas.

2. The method of claim 1, wherein the network is a single-input and multiple-output (SIMO) network.

3. The method of claim 1, wherein the network is a multiple-input and multiple-output (MIMO) network.

4. The method of claim 1, further comprising:

receiving the encoded symbol at the set of receive antennas;

applying a fast Fourier transform to the received symbol to produce a transformed symbol;

applying an iterative likelihood search (ILS) procedure to the transformed symbol using the PRS to produce a detected symbol;

de-mapping the detected symbol.

5. The method of claim 1, wherein the PRPP deliberately introduces inter-channel interference.

6. The method of claim 1, wherein the receiver is a linear minimum mean-square error (LMMSE) receiver.

7. The method of claim 1, wherein the receiver is a zero-forcing (ZF) receiver.

8. The method of claim 6, wherein the receiver is the LMMSE receiver uses ordered successive interference cancellation (SIC) techniques.

9. The method of claim 6, wherein the receiver is a matched-filter receiver.

10. The method of claim 6, where the receiver uses a tabu search procedure with the LMMSE as an initial vector.

11. The method of claim 7, where the receiver is a tabu search procedure with the ZF as an initial vector.

12. The method of claim 1, where the receiver uses a tabu search procedure with matched-filter as an initial vector.

13. The method of claim 6, where the receiver uses a reactive tabu search procedure with the LMMSE as an initial vector.

14. The method of claim 7, where the receiver uses a reactive tabu search procedure with the ZF as an initial vector.

15. The method of claim 1, where the receiver uses a reactive tabu search procedure with matched-filter as an initial vector.

16. The method of claim 6, where the receiver uses a generalized probabilistic data association (GPDA) procedure with the LMMSE as the initial vector.

17. The method of claim 16, where the receiver uses the GPDA procedure zero forcing as the initial vector.

18. The method of claim 16, where the receiver uses the a GPDA procedure with matched-filter as the initial vector.

* * * * *